June 16, 1936.  E. A. SCHUMACHER  2,044,406

BATTERY CELL

Filed July 29, 1933

INVENTOR
ERWIN A. SCHUMACHER
BY
*E. L. Treenewald*
ATTORNEY

Patented June 16, 1936

2,044,406

UNITED STATES PATENT OFFICE 2,044,406

BATTERY CELL

Erwin A. Schumacher, Lakewood, Ohio, assignor, by mesne assignments, to Union Carbide and Carbon Corporation, a corporation of New York Application July 29, 1933, Serial No. 682,773

19 Claims. (Cl. 136—133)

The invention pertains in general to battery cells and in particular to cells that are depolarized by oxygen in the air which enters through a porous carbon electrode partially immersed in a liquid electrolyte.

In cells of this type the electrode is usually carried in an opening in the cell casing or cover through which a portion such as the upper end of the electrode is exposed to the air, and the joint or opening between the electrode and the casing or cover is usually closed or sealed by a filling of thermoplastic sealing material. After such cells are placed in service electrolyte may show creepage at the electrode-seal interface, wetting the carbon at this point, and loosening or breaking the contact with the seal. Thus electrolyte may creep up the electrode and escape through the joint between the seal and the carbon, forming or leading to unsightly incrustations and, in extreme cases, to sufficient reduction in the breathing area of the electrode to interfere with the operation of the battery.

The chief object of this invention is to inhibit, reduce or prevent the escape or creepage of electrolyte up the emergent portion of the carbon electrode of such a cell and thereby improve its operation and prolong its life without materially increasing the cost or size of the battery. These and other objects and novel features will be disclosed in the following specification and the accompanying illustration, in which.

Figure 1:
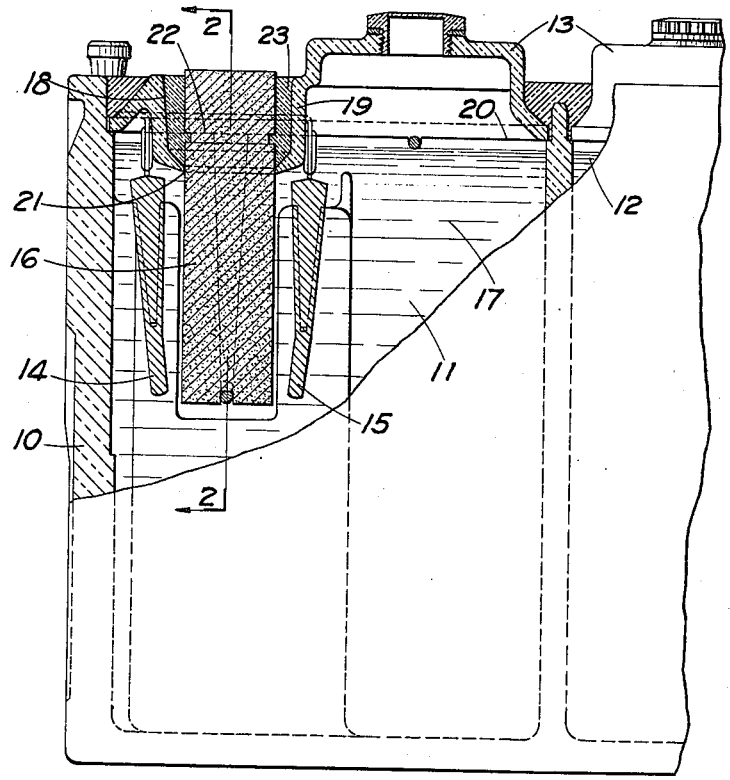
Fig. 1 is a side view of a 2-cell battery with a portion of the side wall broken away to show the carbon electrode, its support, and one example of means for preventing creepage of electrolyte through the joint between the electrode and the cell casing.
Figure 2:
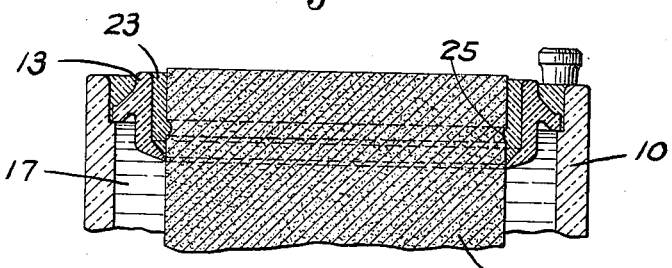
Fig. 2 is a fragmentary section along line 2—2 of Fig. 1 showing another form of the groove in the electrode for preventing creepage of electrolyte.

In cells of this type it has been found that one or more shallow, horizontal, grooves around the portion of the carbon electrode within the sealing material effectively inhibits or prevents the creepage of electrolyte through the joint between the carbon electrode and the sealing material. The effect of this groove or grooves is more than a mere increase in the length of the creepage path as the effectiveness is far greater than that attained by a similar increase in the length of a straight creepage path.

The number, form and location of the grooves may be varied within rather wide limits, as shown by the attached drawing. In a preferred form of the cell, the height of the carbon electrode above the inner edge of the cover is 1¼ inches and a groove $\frac{3}{16}$ inch wide and $\frac{1}{16}$ inch deep is provided in the outer surface of the carbon electrode 1 inch below the top. Two or more of these grooves may be employed and their dimensions may vary. Also the grooves may be provided with a flat bottom or a rounded bottom.

In the preferred embodiment of the invention as shown in the drawing, the battery comprises an outer container 10 having two cell compartments 11 and 12, each provided with a cover 13 that forms part of the casing or container. Each of the compartments 11 and 12 is provided with two zinc electrodes 14 and 15, a carbon electrode 16, and suitable liquid electrolyte 17 having a solid ingredient.

The cover 13 is provided with an opening 18 having a depending wall or electrode support 19 that terminates below the level 20 of the electrolyte 17. The lower portion of the carbon electrode 16 is immersed in the electrolyte 17 and the upper portion extends upward through the opening 18 in the cover 13 to expose the upper end or breathing area to the outer air. The inner surface of the wall 19 of opening 18 is spaced from the outer surface of the electrode 16 with the exception of the lower edge 21 which is turned inward and is but slightly larger than the electrode. The upper portion of the carbon electrode within the opening 18 adjacent the breathing area is provided with an encircling horizontal groove 22 and this groove and the space or joint between the outer surface of the carbon electrode and the inner surface of the opening 18 in the cover are filled with a thermoplastic sealing material 23.

Figure 3:
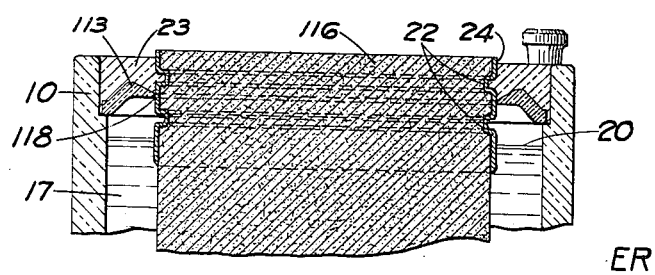
Fig. 3 is a fragmentary section similar to Fig. 2 showing another example of means for preventing creepage, by the use of an electrode having two grooves and a protective coating, in cells where the electrode support is above the electrolyte.

Another example of means for attaining the result is shown in Fig. 3 for cells having an electrode support above the surface of the electrolyte. This cell is similar to that shown in Fig. 1 with the exception that the cover 113 is not provided with the depending wall 19 around the opening 118 for the electrode 116.

In cells of this type the carbon electrode 116 may also be provided with one or more peripheral grooves 22. These grooves may be located in the surface of the electrode at any point between the upper surface of the electrolyte and the upper end or breathing area of the electrode. Superior results may be attained, however, when at least one of the grooves is in the portion of the electrode within the sealing material 23. This portion of the electrode between that in contact with the electrolyte 17 and that exposed to the air may also be provided with a surface coating or covering 24 of suitable thermoplastic material making a close contact or joint with the surface of the electrode and the groove or grooves therein through which the electrolyte will not creep. Such a coating material may comprise soft asphalt to which paraffin may be added to lower the melting point and secure better adhesion and closer contact with the carbon electrode. This coating material or coating may have a lower melting point than the sealing material 23 employed to close the top of the cell. A suitable thermoplastic material that forms a satisfactory coating may, for example, comprise substantially equal parts of asphalt and paraffin, although the proportion of the ingredients may be varied to change the melting point.

This thermoplastic material or composition may be readily applied to the electrode to form the coating described by dipping the upper grooved portion of the electrode into the molten composition, and the thickness of the coating may be increased by repeating the dipping operation until a coating of the desired thickness is obtained. Also, if desired, a relatively hard outer layer may be superimposed on the soft inner coating by giving the coated electrode a final dipping in a similar material having a higher melting point.

This coating 24 may extend from the upper end of the electrode down below the surface of the electrolyte, and after the coating has been applied the upper end of the electrode may be removed, by sawing off a portion for example, to remove the coating from the top end and expose a satisfactory breathing surface. Preferably, this coating 24 is applied to the carbon electrode before the electrode is assembled in the cell. In the complete cell, the coating 24, and preferably that portion of the coating covering the surface of at least one of the grooves 22, is supported or surrounded by the sealing material 23 employed to close the top of the cell.

By providing the electrode with one or more grooves in the portion covered by the sealing material, creepage of electrolyte through the joint between the electrode and the seal is inhibited. Also, by locating at least one of these grooves within the larger body 23 of sealing material, the coating 24 is supported at the groove and this makes it more difficult for the creepage of electrolyte to break the coating away from the electrode should creepage proceed to that point.

Other features of this cell which are shown in the drawing but not claimed in this application are covered by the following copending applications: Serial No. 663,697, filed March 31, 1933, by G. W. Heise, Serial No. 374,519, filed June 28, 1929, by G. W. Heise, Serial No. 508,788, filed January 4, 1931, by D. Domizi.

Various changes may be made in the size, form, and relative position of the component parts without departing from the range of the invention or the scope of the claims.

I claim:—

1. In an air-depolarized primary battery cell having liquid electrolyte; a carbon electrode having a portion exposed to the air outside said cell; a support for said electrode between said electrolyte and said exposed portion; said electrode having one or more grooves therearound within said support; and a thermoplastic sealing material between said support and said electrode extending into said grooves.

2. In a battery having a container and liquid electrolyte comprising a solid ingredient; a carbon electrode extending through said container to the outer atmosphere and provided with one or more grooves in the outer surface thereof adjacent said container; and a sealing material between said container and said electrode extending into said grooves.

3. In a battery having liquid electrolyte comprising a solid ingredient; a carbon electrode having a portion exposed to the outer atmosphere and one or more grooves in the outer surface thereof; a support for said electrode; and a sealing material in said grooves between said electrode and said support.

4. In a battery cell having liquid electrolyte comprising a solid ingredient; a support; a carbon electrode extending through said support to the outer atmosphere; a sealing material between said support and said electrode; and means for preventing creepage of said electrolyte through the joint between said electrode and said sealing material comprising one or more grooves in the surface of said electrode to receive said sealing material.

5. In a battery cell having electrolyte; a carbon electrode; a support for said electrode above said electrolyte; a seal between said support and said electrode; and means to inhibit creepage of said electrolyte through said seal comprising one or more substantially horizontal grooves in the surface of said electrode within said seal.

6. In a battery cell; a carbon electrode; a support surrounding said electrode; a seal between said electrode and said support; and means to inhibit creepage of electrolyte through said seal comprising one or more grooves in said electrode in contact with said seal.

7. In a battery cell; a container having an opening therein; a carbon electrode extending through said opening and provided with one or more grooves in the surface thereof within said container; and a sealing material in contact with said electrode and said container and substantially filling said grooves.

8. In an air-depolarized battery cell, the combination of a casing having an opening therein; a carbon electrode having one end thereof exposed to the air through said opening and laterally spaced from the inside of said casing, said electrode having a peripheral groove in the lateral surface thereof adjacent said exposed end; and sealing material in the space between said electrode and said casing, a portion of said sealing material projecting into and substantially filling said groove.

9. In a battery cell; a casing having an opening therein; a peripherally grooved carbon electrode in said opening; and a sealing material in said opening having a portion thereof projecting into the peripheral groove of said electrode.

10. In a battery cell; a liquid electrolyte; a casing having an opening therein below the surface of said electrolyte; a carbon electrode in said casing extending outward through said opening and having one or more grooves in the surface thereof within said opening; and a sealing material around said electrode in said opening and said groove or grooves.

11. In an air-depolarized cell; a carbon electrode having one or more grooves in the surface thereof; a support for said electrode; and a sealing material in contact with said groove or grooves and said support.

12. In a battery cell; a liquid electrolyte; a carbon electrode having a portion immersed in said electrolyte, a portion exposed to the atmosphere, and one or more grooves in the surface thereof between said portions; a support between said portions; and a sealing material in contact with said support and said electrode between said portions.

13. In a battery cell; a liquid electrolyte; a carbon electrode having a portion immersed in said electrolyte, a portion exposed to the outer atmosphere, and one or more grooves therein between said portions; a support for said electrode; a coating of sealing material on said electrode between said portions; and another sealing material having a higher melting point between said coating and said support.

14. In a battery cell; a liquid electrolyte; a carbon electrode having a portion immersed in said electrolyte, a portion exposed to the atmosphere, and one or more grooves therearound in the surface thereof between said portions; a support surrounding said electrode between said portions; and sealing material covering said surface and filling the opening between said electrode and said support.

15. A carbonaceous electrode for use in an air-depolarized cell, said electrode having a peripheral groove adjacent one end thereof and a thermoplastic material substantially filling said groove.

16. A substantially rectangular carbon electrode for use in an air depolarized cell, said electrode having a continuous peripheral groove extending across its side and end faces adjacent the breathing end of the electrode, and a thermoplastic material in contact with and substantially filling said groove.

17. A carbon electrode for use in an air-depolarized cell, said electrode having a breathing area and a peripheral groove therearound adjacent said breathing area; and a thermoplastic coating on the surface of said electrode adjacent said breathing area and also on the surface of said groove.

18. A carbon electrode for use in an air-depolarized cell, said electrode having a breathing area comprising substantially the upper end thereof and a plurality of peripheral grooves therearound in the sides thereof adjacent said breathing area; and a closely adherent thermoplastic coating on the surface of said grooves and the surface of said electrode around said breathing area.

19. A carbon electrode for use in an air-depolarized cell, said electrode having one or more grooves in the surface thereof adjacent the upper end; a coating of comparatively soft thermoplastic material having a relatively low melting point on the surface of said electrode adjacent the upper end thereof including the surface of said groove or grooves; and a coating of comparatively hard thermoplastic material having a relatively high melting point on said soft thermoplastic material.

ERWIN A. SCHUMACHER.